Nov. 4, 1958 J. FULLEMANN 2,858,666
TURBOCHARGING OF TWO-CYCLE ENGINES
Filed Jan. 25, 1954 4 Sheets-Sheet 1

INVENTOR.
JOHN FULLEMANN
BY
ATTORNEYS

Nov. 4, 1958
J. FULLEMANN
2,858,666
TURBOCHARGING OF TWO-CYCLE ENGINES
Filed Jan. 25, 1954
4 Sheets-Sheet 2
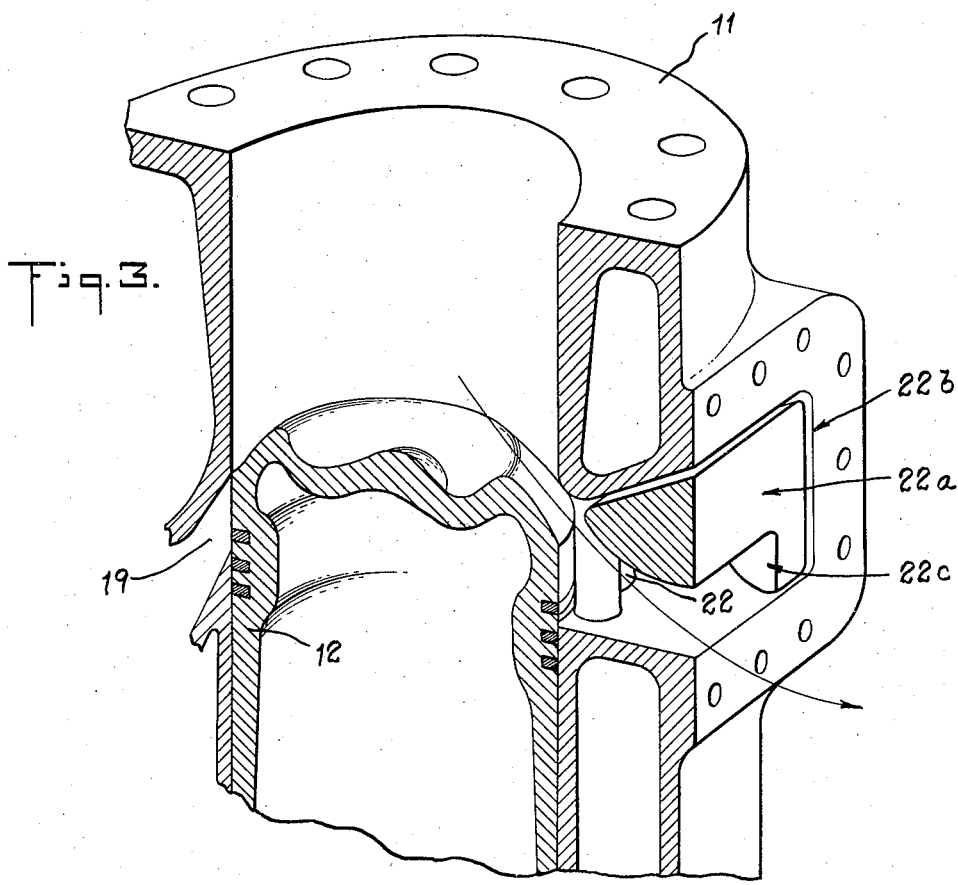
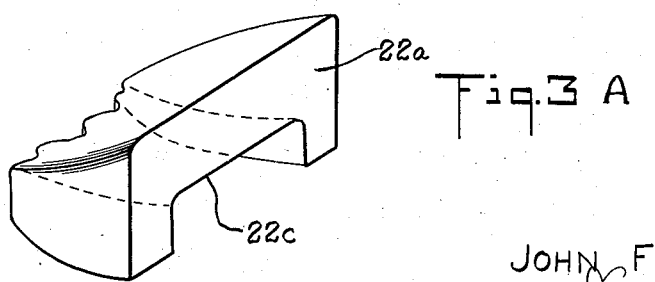
INVENTOR.
JOHN FULLEMANN
BY
ATTORNEYS Nov. 4, 1958  J. FULLEMANN  2,858,666
TURBOCHARGING OF TWO-CYCLE ENGINES
Filed Jan. 25, 1954  4 Sheets-Sheet 3

INVENTOR.
JOHN FULLEMANN
BY
ATTORNEYS

Nov. 4, 1958    J. FULLEMANN    2,858,666
TURBOCHARGING OF TWO-CYCLE ENGINES
Filed Jan. 25, 1954    4 Sheets-Sheet 4
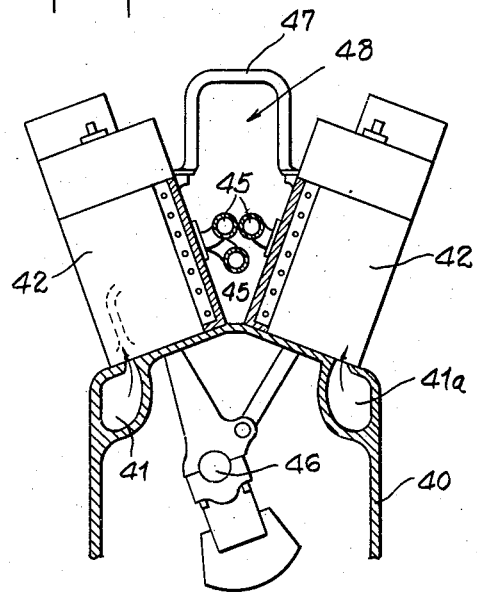
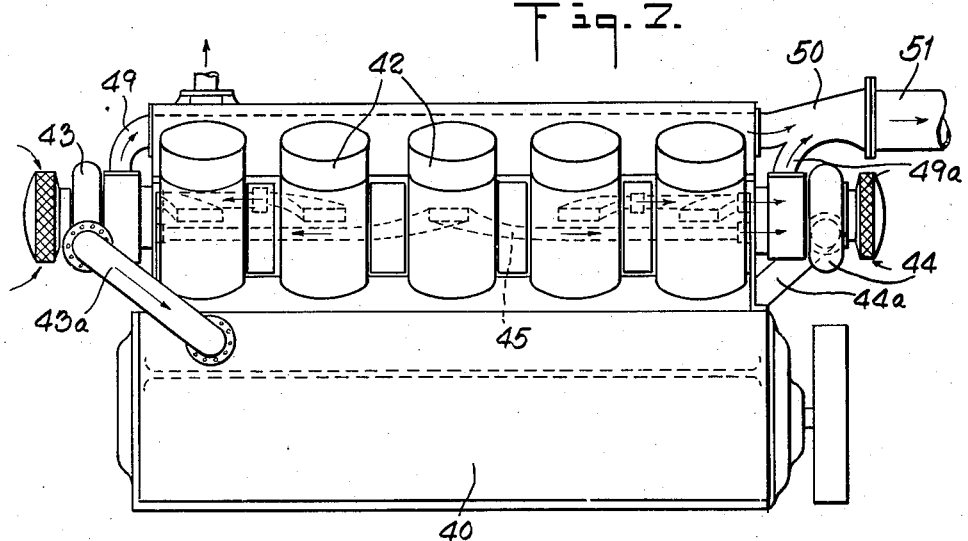
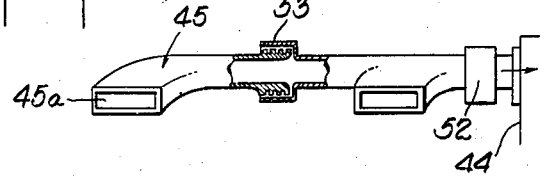
INVENTOR.
JOHN FULLEMANN
BY Davis, Hoxier Faithfull
ATTORNEYS United States Patent Office 2,858,666
Patented Nov. 4, 1958

2,858,666

TURBOCHARGING OF TWO-CYCLE ENGINES

John Fullemann, Mount Vernon, Ohio, assignor to The Cooper-Bessemer Corporation, Mount Vernon, Ohio, a corporation of Ohio Application January 25, 1954, Serial No. 405,814

15 Claims. (Cl. 60—13)

This invention relates to internal combustion engines, and particularly to an improved two-cycle engine which is turbocharged, that is, supercharged by a compressor or blower operated from a turbine driven by the engine exhaust.

Two-cycle engines, unlike four-cycle engines, will operate only if the scavenging air pressure is well above the exhaust pressure, at all loads. Consequently, the turbocharging of two-cycle engines presents problems quite different from those encountered in four-cycle engines. With conventional turbocharging, the operation of the turbine and scavenging blower from the engine exhaust imposed a back pressure on the engine, and the delivered air pressure from the blower must exceed this exhaust back pressure. In two-cycle engines, this is possible under certain favorable conditions (high turbine and blower efficiencies, and high gas temperatures to the turbine) which usually prevail only at high engine loads. At full load, the positive pressure differential might be sufficient to insure adequate cylinder scavenging. At lower loads, however, the engine is starved for air unless the air pressure is raised artificially, as by means of an auxiliary mechanical blower or a mechanical drive to the turbocharger shaft.

This problem has been recognized ever since turbocharging was introduced to four-cycle engines. Many attempts have been made to apply turbochargers to two-cycle engines as well, usually by combining a very efficient turbocharger with an auxiliary mechanical drive, or blower. All of these schemes, however, are complicated and expensive. On the other hand, two-cycle turbocharging without any mechanical aids requires either a vastly more efficient turbocharger or an additional source of turbine power. The first of these alternatives offers no promise, because calculations show that for satisfactory zero and low-load operation of the two-cycle engine, the combined turbocharger efficiency (blower efficiency times turbine efficiency) must be at least 100%, which is obviously impossible. In line with the second alternative, it has been proposed to boost the turbine power by burning additional fuel between the engine exhaust and the turbine; but this has been found to be too complicated and dangerous.

There is, however, a further possibility of harnessing additional turbine energy through what is known as the "blowdown" turbine system. This system utilizes the high pressure wave from each cylinder discharge, prior to emptying the exhaust manifold, to aid the subsequent cylinder scavenging phase. On four-cycle engines, by virtue of a special exhaust manifold arrangement, this "blowdown" turbine system gains about 30–40% more turbine power than the conventional back-pressure system. If this "blowdown" system could be applied to a two-cycle engine, and improved to gain about 100% of additional power in the low-load range (where combined turbocharger efficiency is only about 50%), the problem could be solved.

The application of this "blowdown" turbine system to two-cycle engines, however, presents a serious problem. Four-cycle engines allow a time interval represented by 160 crank degrees (or 22% of the whole cycle) in which to build up a pressure wave, drive the turbine with it, and then drain the engine exhaust manifold prior to scavenging. Two-cycle engines, on the other hand, allow only about 15 crank degrees (or 4% of the cycle) in which to do the same thing. If this "blowdown" principle were applied to two-cycle engines, in the manner in which it has been applied to four-cycle engines, the pressure waves would interfere with the scavenging phase in the two-cycle engine, which would be worse than using the old constant back-pressure system.

I have discovered that by departing radically in certain respects from the prior practices in turbocharging, it is possible in two-cycle engines to drive most of the exhaust gases from each cyclinder through the turbine in the relatively short time represented by the 15 crank degrees between the opening of the exhaust and air inlet ports, and at the same time to build up a pressure wave which, though extremely short in duration, is powerful enough to furnish all of the necessary blower horsepower.

According to the present invention, the nozzles of the turbine for the blower are supplied with exhaust gases from the engine by way of one or more exhaust manifold pipes each communicating with the exhaust ports of one, two or three cylinders and having a critical relation, dimension-wise, to certain characteristics of the engine. More particularly, the volumetric capacity of such a manifold pipe is no greater than the swept volume of one cylinder of the engine (bore area times length of piston stroke), preferably 40 to 60% of the cylinder volume; and the length of the manifold pipe is no greater than K/N (where N is the normal engine speed in R. P. M. and K is a factor between 1500 and 2200) in order to keep secondary or reflection waves under control, allowing 10 to 15 crank degrees between wave reflections. The exhaust manifold pipe is therefore small in both volume and length, as compared with the usual practice heretofore; and in order to satisfy the volumetric requirement it may be necessary in some instances to make the cross-sectional area of the interior of this manifold pipe smaller than the effective exhaust port area of each cylinder, thereby resulting in a manifold pipe about $\frac{1}{10}$ the conventional size. Because of the short length requirement, long multi-cylinder engines having more than three crank throws may need multiple turbochargers, for example, one fore and one aft of the engine.

I have also found that the operation is improved by employing a certain relation between the throughflow area of the turbine nozzle or nozzles and the effective exhaust port area of one cylinder, that is, by making the turbine nozzle area (for each exhaust manifold) equal to 30–50% of the cylinder exhaust port area. The turbine for a four-cylinder engine will thus be about twice the size of the turbine used in a conventional back-pressure system. Also, it is desirable that the interior of the manifold pipe have a cross-sectional area of about 1.0 to 1.8 times the turbine nozzle area which it supplies.

To avoid interference between blowdown and scavenging phases of the cylinders connected to an exhaust manifold pipe, I connect the latter to two or three cylinders having a firing interval or spacing approximately 120 degrees in terms of crank angle. This 120 degree spacing of the pressure impulses in the exhaust manifold pipe has a desirable supercharging effect in blocking the end of a scavenging phase with the next pressure wave. In addition, it enables each pressure wave to be built upon the top of a positive back-pressure level established in the manifold pipe during scavenging, resulting in a pressure wave substantially more powerful than is otherwise possible.

A further feature of the invention resides in a novel exhaust manifolding arrangement, in which at least one engine exhaust pipe leading to a turbine is disposed in a discharge passage for the turbine exhaust.

The invention will now be described in further detail by reference to the accompanying drawings, in which:

Fig. 3 is a detailed perspective view, partly in section, of one of the cylinders, showing an insert in a standard exhaust port for adapting it to turbocharging according to the invention;

Fig. 3A is a perspective view of the insert;

Figure 1:
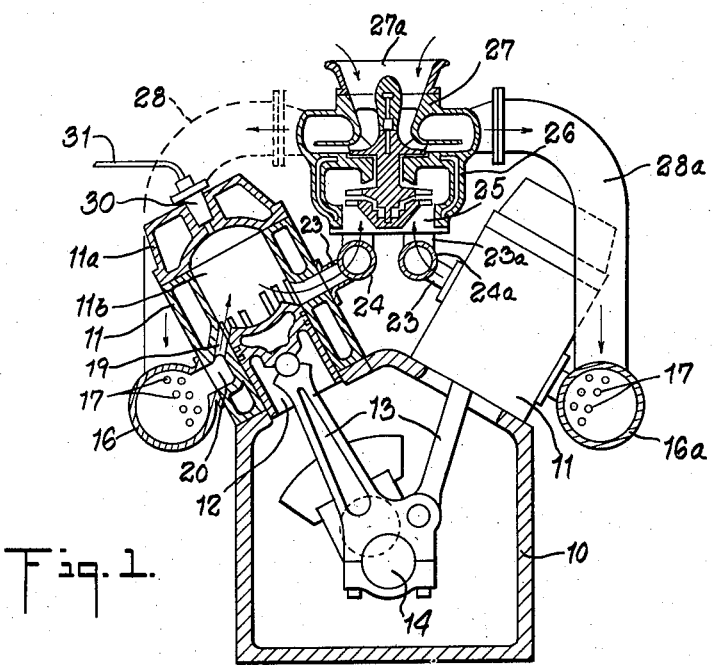
Fig. 1 is a schematic view, partly in cross-section, of a six-cylinder two-cycle engine having a turbocharging system according to the invention.
Figure 2:
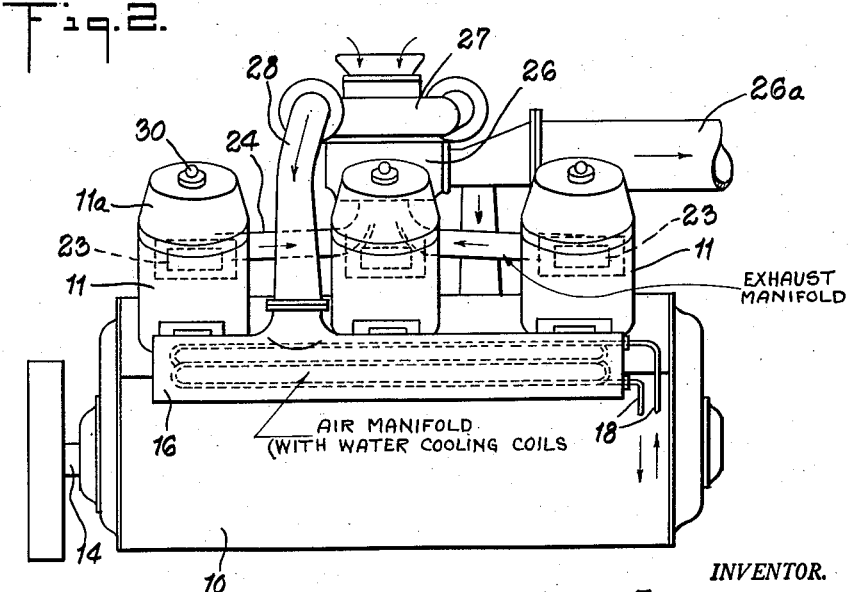
Fig. 2 is a schematic view of the engine in side elevation.

Figs. 6 and 7 are views similar to Figs. 1 and 2, respectively, but showing another form of the engine, and Fig. 8 is a detailed perspective view of part of the engine shown in Figs. 6 and 7.

Referring to Figs. 1 and 2, the engine comprises a hollow frame 10 supporting a series of cylinders 11 which, as shown, are arranged in two groups each having three cylinders, to provide a six-cylinder V-engine. Each cylinder contains a piston 12 from which a connecting rod 13 extends to the crank shaft 14 in the frame.

The two groups of cylinders 11 are provided with air manifolds 16 and 16a, respectively, extending longitudinally along the sides of the engine. The air manifolds contain coils 17 through which water is circulated by way of external connections 18 leading to and from a suitable source (not shown), for the purpose of cooling the air in these manifolds. The cooled air is admitted to each cylinder through an air inlet port 19 located near the bottom of the cylinder, as defined by the lowermost position of its piston 12. Each port 19, as shown, is made up of a series of circumferentially spaced slots leading from a channel 20 connected with the adjacent air manifold 16 or 16a.

The slots forming the inlet port 19 of each cylinder are opposed by similar slots forming an exhaust port 22, the latter, however, extending farther toward the cylinder head 11a than the inlet port 19. The exhaust ports 22 of the two cylinder groups are connected by short ducts 23 to exhaust manifold pipes 24 and 24a, respectively, which will be described in greater detail presently. These exhaust pipes extend along the space formed by the V-arrangement of the cylinders and lead to the nozzles 25 of a turbine 26 which exhausts through a pipe 26a. The turbine is mounted on the engine between the two cylinder groups and about mid-way along the V which they form. It supports and drives an air blower or compressor 27 having an air inlet 27a leading to its low pressure side. The high pressure or discharge side of the blower has branch pipes 28 and 28a leading to the air manifolds 16 and 16a, respectively.

The introduction of the fuel into the cylinders and the ignition of the combustible mixture therein, may be effected in any conventional manner. For illustrative purposes, I have shown a fuel injection nozzle 30 in the head of each cylinder, through which oil, gas or other fuel is injected under pressure from a supply line 31 while the piston is near or at the upper end of its stroke, combustion in this case being initiated by autoignition, as in the diesel cycle. The mechanical arrangement for this injecting of the fuel in timed relation to the piston movements forms no part of the present invention and, since such arrangements are well known in the art, there is no need to describe its details. It will be understood that gas cycles other and the diesel cycle may be used.

The exhaust manifold pipes 24–24a, with which the present invention is particularly concerned, will now be described in greater detail. As a first requirement, the volume (volumetric capacity) of each exhaust manifold pipe does not exceed the volume of one of the cylinders 11 (its volumetric capacity 11b when the piston 12 is at the bottom of its stroke), and is preferably between 40 and 60%, say 50%, of the cylinder volume. The volumetric capacity of each exhaust manifold pipe is here taken to be the internal volume of the manifold proper (24 or 24a) as well as the internal volumes of its short connections 23 with the cylinder exhaust ports and its short connections 23a with the turbine nozzles 25. In other words, it is the volume between (but not including) the cylinders and the turbine nozzles associated with the exhaust pipe 24 or 24a.

As a second requirement, each exhaust manifold pipe is very short, in order to keep pressure reflection waves under control. Specifically, its length L in feet does not exceed $K/N$, N being the rated number of revolutions per minute of the crank shaft 14 (R. P. M.) and K being a factor between 1500 and 2200 (which is a function of the velocity of the pressure waves and allows 10–15 degrees rotation of crank 14 between pressure wave reflections). Thus, in an engine having a rated R. P. M. of 440, the length L of each exhaust manifold pipe 24 or 24a should not exceed 5 feet. In order to meet the volume requirement previously specified, without making the exhaust pipes 24—24a too small in cross-sectional area, it may be desirable to make these pipes less than the maximum permissible length, which can be accomplished, if necessary, by connecting only two instead of three cylinders 11 to each exhaust pipe. The spacing between the cylinders connected to the same exhaust pipe will determine the minimum length of this pipe, and practical considerations of design will therefore determine the minimum length. In long multi-cylinder engines having more than three crank throws, it may be necessary to use more than one turbocharger combination 26—27, in order to locate the cylinders nearer the turbocharger which they supply and thereby reduce the length of each exhaust pipe 24—24a. The length L of each exhaust manifold pipe is here taken to be the maximum centerline length which goes to make up the manifold volumetric capacity described in connection with the first requirement, this length as illustrated being the distance along the center of pipe 24 (or 24a) between the center lines of the short connecting ducts 23 of the two end cylinders of the corresponding group of three cylinders, and thence along these center lines to the end cylinders themselves.

In order to satisfy the volumetric requirement of the exhaust manifold pipes, it may be necessary to give the pipes 24 and 24a a cross-sectional area which is less than the minimum exhaust port area of a cylinder 11, that is, the minimum through-flow area between the interior of the cylinder and the orifice leading to its duct 23 connected to the exhaust manifold, including the port slots 22. In these cases, the exhaust manifolds 24—24a may be only 10% of the conventional size of such manifolds.

For optimum performance, the turbine nozzle area supplied by each exhaust manifold 24—24a is 30–50%, say 40%, of this minimum or effective exhaust port area of one cylinder. The turbine nozzle area is here taken to be the minimum through-flow area of the nozzle 25 supplied by the exhaust manifold, or, if the turbine 26 has more than one nozzle supplied from the same exhaust manifold, the combined minimum through-flow areas of these nozzle means.

In order to meet the dimensional requirements previously specified for the exhaust manifold pipes, it is necessary or at least desirable that the exhaust port of each cylinder 11 be made considerably smaller in effective through-flow area than a standard exhaust port for the particular engine. In adapting a standard two-cycle engine for turbocharging according to the invention, I therefore apply an insert into the exhaust port of each cylinder, as shown in Figs. 3 and 3A. As there shown, the insert is a block 22a fitted closely into the outer portion of the standard exhaust port 22b and having a horizontally extending slot 22c forming the minimum through-flow area of the exhaust port, this slot leading from the vertical slots 22 opening into the interior of the cylinder. The block 22a may be secured in position by welding, or the like, or by a flange of the short connecting duct 23 bolted to the cylinder around the standard exhaust port 22b. The use of these inserts 22a in the standard exhaust ports allows a reduction of the exhaust manifold volume, in accordance with the requirement first noted above, and avoids turbulence.

In the preferred construction, the internal cross-section area of each exhaust manifold pipe 24—24a is about 1.0 to 1.8 (say 1.4) times the turbine nozzle area supplied by this exhaust pipe.

It will be understood that in the operation of the engine the downward or power stroke of each piston 12, under the action of the combustion gases in the cylinder, uncovers the exhaust port 22 to admit a pressure wave to the corresponding exhaust pipe 24 or 24a, and then uncovers the air inlet port 19 to allow scavenging air to pass through the cylinder and the exhaust port into the exhaust pipe. This scavenging air is supplied under pressure by way of the air manifold 16 or 16a from the turbocharger 26—27, which is driven on the "blow-down" principle by the pressure waves passing to the turbine nozzles 25 from the exhaust manifold pipes 24—24a. On its upward or compression stroke, each piston first covers the air inlet port 19 and then the exhaust port 22 of the cylinder.

To avoid interference between the blow-down and scavenging phases of the cylinders, a single exhaust manifold pipe 24 or 24a should be connected to either two or three cylinders 11 having a minimum firing interval or spacing of 120° in terms of crank angle. Thus, in the illustrated embodiment the three cylinders 11 of one group are connected to the exhaust manifold 24 while the three cylinders 11 of the other group are connected to the exhaust manifold 24a; and the three pistons of each group are connected to the crank shaft 14 at 120° intervals, so that the six cylinders fire at intervals of 60°. If the engine has more than six cylinders, the additional cylinder or cylinders can be connected to one or more separate exhaust manifolds conforming to the dimensions heretofore specified, it being preferable to provide a separate exhaust manifold for only one cylinder rather than to make that cylinder the fourth one connected to a single manifold. If the number of exhaust manifolds becomes too great for a single turbine, the excess manifolds can be connected to one or more additional turbochargers.

Figures 4, 4A:
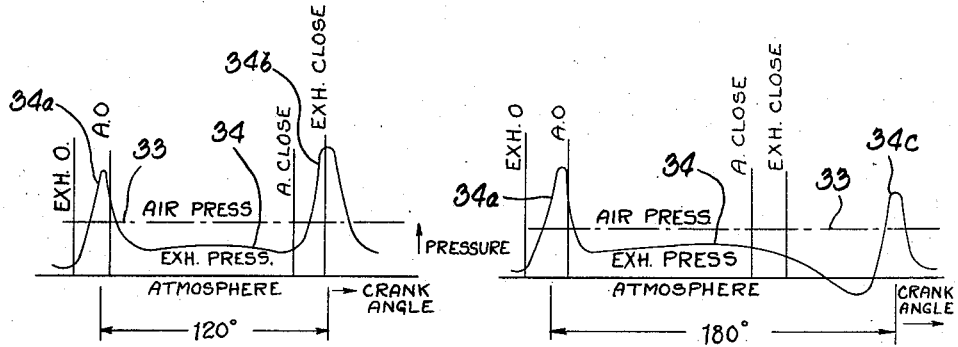
Fig. 4 is a pressure diagram of one of the exhaust manifolds, showing the effect of the 120 degree firing interval between cylinders connected to the same exhaust manifold pipe.
Fig. 4A is a similar diagram showing, for the purpose of comparison, the effect with a firing interval of 180 degrees.

The 120° impulse spacing in each exhaust manifold pipe is preferable to a longer spacing, because it seems to give a supercharging effect by blocking the end of a scavenging phase with the next following pressure wave. Additionally, it substantially increases the power of the pressure waves acting upon the turbine through the exhaust pipe. This is illustrated in Figs. 4 and 4A, which are diagrams showing the scavenging air pressure 33 maintained by the turbocharger in each air manifold 16—16a, and the pressures 34 prevailing in each exhaust pipe 24—24a through crank angles of 120° and 180°, respectively, representing the firing intervals between the cylinders connected to the same exhaust pipe. As shown in Fig. 4, starting with about atmospheric pressure in the exhaust pipe, the exhaust pressure builds up rapidly to form a pressure impulse wave 34a between the opening of the exhaust port 22 (Ex. O) and the opening of the scavenging air port 19 (A. O) of the first cylinder to fire. Shortly after the air port opens, the exhaust pressure 34 falls considerably below the air pressure 33 but levels off more or less above atmospheric pressure, where it remains during the scavenging phase. By the time the air port 19 closes (A close), the exhaust port 22 opens in the next cylinder (of the cylinders connected to the same exhaust pipe), so that the resulting pressure wave 34b in the exhaust pipe 24 or 24a is built upon the positive pressure which remained in this pipe. Consequently, the pressure wave 34b is substantially more powerful than the starting pressure wave 34a, as shown, and the same will be true of the subsequent pressure waves as the three cylinders fire in their order with the 120° interval.

As shown in Fig. 4A, the initial pressure wave 34a will be the same as the initial wave 34a in Fig. 4, assuming again that the starting pressure in the exhaust manifold is about atmospheric; but the subsequent pressure waves are substantially weaker because of the greater firing interval (180°) between the cylinders. That is, after the air port 19 and exhaust port 22 of the first cylinder close (A close and Ex. close), the exhaust pressure 34 drops to below atmospheric pressure, which prevails when the exhaust port of the second firing cylinder opens. The resulting pressure wave 34c is thus substantially weaker than the initial wave 34a, since it is built upon sub-atmospheric pressure, and the same applies to the subsequent pressure waves as the cylinders fire with their 180° interval.

Figure 5:
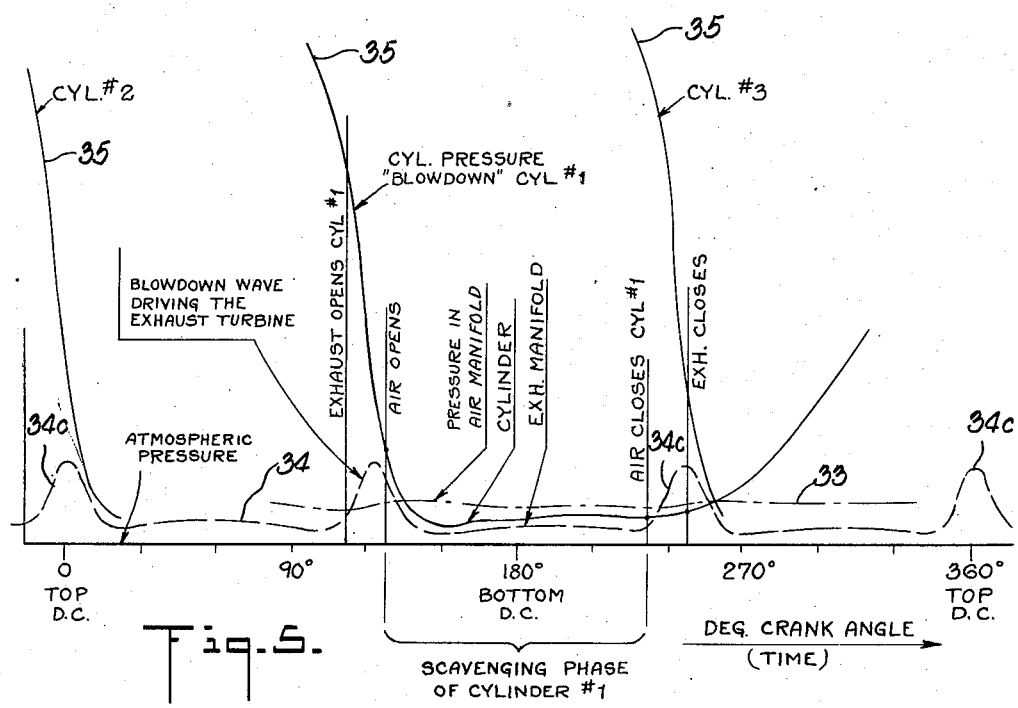
Fig. 5 is a cycle diagram for one of the exhaust manifolds serving three cylinders, as in Figs. 1 and 2.

A typical cycle diagram for the engine illustrated in Figs. 1 and 2 is shown in Fig. 5, this diagram applying to one of the exhaust manifolds 24—24a to which three cylinders 11 are connected. As there shown, the cylinder pressures are represented by the full-line curves 35, the air manifold pressure by the dot-dash line 33, and the exhaust manifold pressure by the broken line 34. It will be noted here that the air manifold pressure 33 remains at a substantially constant value between the peaks of the pressure waves 34c formed by opening of the exhaust ports 22 at 120° intervals, and the exhaust pressure 34 prevailing during most of the scavenging phases. Thus, the turbine 26 is driven by an exhaust pressure in manifold 24 or 24a which is always above atmospheric and which is peaked at 120° intervals, as shown at 34c, to provide strong pressure impulses acting on the turbine. It will also be noted that the interval between opening of the exhaust and air ports 22 and 19 of each cylinder is 10 to 15° crank degrees, as is characteristic of two-cycle engines. If the exhaust port is opened at an earlier point in the cycle, the energy to the turbine 26 is increased (about 23% for a timing advance of 5°) but at a loss of engine efficiency.

Since exhaust-driven turbines and blowers or compressors driven thereby for supercharging are well known in the art, it is not necessary to describe the details of the parts 26—27.

Referring now to Figs. 6–8, I have there shown a ten-cylinder engine of the V-type in which the frame 40 is provided with integral internal air manifolds 41 and 41a supplying the respective two groups of cylinders 42, five in each group. The engine has fore and aft turbochargers 43 and 44, respectively, the compressor or blower units of which are connected by pipes 43a and 44a to the air manifolds 41 and 41a, respectively. The exhaust ports (not shown) of the cylinders are connected by manifold pipes 45 to the nozzles of the two turbine units, so that each turbine is driven from the exhaust of five cylinders. It will be understood that the majority of the exhaust pipes 45 are each connected to either two or three cylinders 42 and otherwise conform to the exhaust pipes 24—24a as described in connection with Figs. 1–3. As shown, each turbocharge 43—44 is supplied by three exhaust pipes 45, two of which connect with the adjacent opposed pairs of cylinders, respectively, while the third connects with the center cylinder of one of the two groups. Alternatively, each turbine could be supplied by two pipes 45, one connected to the three adjacent cylinders at one side of the V and the other to the two adjacent cylinders at the opposite side of the V.

It will also be understood that cylinders 42 can be ported, fueled and fired as described in connection with Figs. 1–3, and their pistons are connected to a crank shaft 46.

The space formed by the V-arrangement of the cylinders is covered by a water-jacket cover 47 to form a receiver or passage 48 for the exhaust from one of the turbine units. As shown, the turbine of the forward turbocharger 43 exhausts into this passage through a pipe 49. The exhaust from this turbine passes through the passage 48 to a discharge pipe 50, which joins the exhaust pipe 49a from the aft turbine and connects with a common turbine exhaust manifold 51.

With this arrangement, the hot exhaust gases from the turbocharger 43, as they pass through the passage 48, surround the exhaust pipes 45 which supply the turbines from the engine cylinders. Accordingly, the heat loss between these cylinders and the turbines is greatly reduced without the use of lagging. In other words, the heat loss from the cylinder exhaust gases passing to the turbines by way of manifold pipes 45 is greatly reduced by exposing these pipes to the turbocharger exhaust gases in the surrounding passage 48 rather than to the lower ambient temperature of the atmosphere. Also, simple expansion joints can be used in the pipes 45 in lieu of the intricate joints usually required, since leakage from these pipes can be tolerated due to the fact that the leakage merely passes into the passage 48 with the turbine exhaust. Thus, the expansion joints 52 may, for example, take the simple form illustrated in Fig. 8, which includes a sleeve in which a group of piston rings 53 is slidable. As shown in Fig. 8, the portions of each exhaust manifold pipe 45 which connect with the cylinders are rectangular in cross-section, so that they conform with the shape of the horizontal slot 22c in the insert blocks 22a (Fig. 3).

The cover 47 is often used on engines of conventional design, to provide a receiver into which the engine cylinders exhaust directly. Such engines are particularly adapted to be converted for turbocharging according to Figs. 6–8, by using the conventional manifold 48 for the turbine exhaust rather than the engine exhaust, and extending the engine exhaust pipes 45 through this manifold on their way to the turbine. The construction shown in Figs. 6–8, in addition to providing the advantages noted above, affords sound-proofing of the engine.

I claim:

1. In a two-cycle internal combustion engine having combustion cylinders each with ports for exhaust and air inlet, respectively, crank-connected pistons in the cylinders, an exhaust-driven turbine provided with nozzle means for receiving exhaust gases, a compressor driven by the turbine, an air manifold to which air is supplied by the compressor, and air-supply connections between the manifold and the inlet ports, the improvement which comprises an exhaust manifold pipe communicating with the exhaust ports and having a volumetric capacity not in excess of the volumetric capacity of one cylinder and having a length in feet not in excess of $K/N$, where N is the rated engine speed in R. P. M. and K has a value of 2200, the exhaust manifold pipe being connected to supply the nozzle means of the turbine.

2. The improvement according to claim 1, in which the volumetric capacity of the exhaust manifold pipe is 40 to 60% of the volumetric capacity of one cylinder.

3. The improvement according to claim 1, in which the nozzle area of the turbine nozzle means is 30–50% of the effective exhaust port area of one cylinder.

4. The improvement according to claim 1, in which the cross-sectional area of the interior of the exhaust manifold pipe is 1.0 to 1.8 times the nozzle area of the turbine nozzle means.

5. The improvement according to claim 1, in which the cross-sectional area of the interior of the exhaust manifold pipe is less than the effective exhaust port area of one cylinder.

6. The improvement according to claim 1, in which the effective exhaust port area of each cylinder is defined by an insert in the exhaust port.

7. The improvement according to claim 1, in which the number of cylinders having their exhaust ports in communication with the exhaust manifold pipe is not greater than three.

8. The improvement according to claim 1, in which said cylinders have a firing interval of about 120° in terms of crank angle.

9. The improvement according to claim 1, comprising also at least one additional exhaust manifold pipe conforming to said volumetric capacity and length, each of said manifold pipes communicating with the exhaust ports of at least two but not more than three cylinders and being connected to supply the nozzle means of the turbine.

10. The improvement according to claim 1, comprising also at least one additional exhaust manifold pipe conforming to said volumetric capacity and length, each of said manifold pipes communicating with the exhaust ports of at least two but not more than three cylinders and being connected to supply the nozzle means of the turbine, the cylinders whose exhaust ports are in communication with a common manifold pipe having a firing interval of about 120° in terms of crank angle.

11. The improvement according to claim 1, comprising also means on the engine forming a turbine exhaust passage leading from the turbine, said manifold pipe extending to the turbine through the exhaust passage, whereby the manifold pipe is subjected to the exhaust gases from the turbine.

12. The improvement according to claim 1, in which the cylinders are arranged in two rows forming a V, and comprising also at least one additional exhaust manifold pipe conforming to said volumetric capacity and length, each of said pipes communicating with the exhaust ports of at least two but not more than three cylinders and extending to the turbine by way of the space between said rows forming the V, and a jacketed cover spanning said space to form a turbine exhaust passage leading from the turbine, whereby the manifold pipes are enveloped by the exhaust gases from the turbine.

13. The improvement according to claim 1, in which the nozzle area of the turbine nozzle means is 30–50% of the effective exhaust port area of one cylinder, the cross-sectional area of the interior of the exhaust manifold pipe being less than the effective port area of one cylinder.

14. The improvement according to claim 1, in which the nozzle area of the turbine nozzle means is 30–50% of the effective exhaust port area of one cylinder, the cross-sectional area of the interior of the exhaust manifold pipe being less than the effective port area of one cylinder, said cylinders having a firing interval of about 120° in terms of crank angle.

15. In an internal combustion engine having combustion cylinders each with ports for exhaust and air inlet, respectively, crank-connected pistons in the cylinders, an exhaust-driven turbine provided with nozzle means for receiving exhaust gases for driving the turbine and having its own exhaust outlet, a compressor driven by the turbine, an air manifold to which air is supplied by the compressor, and air-supply connections between the manifold and the cylinder inlet ports, the improvement which comprises an exhaust manifold pipe communicating with the cylinder exhaust ports and leading to the turbine nozzle means, and an exhaust manifold leading from the turbine exhaust outlet and through which said exhaust manifold pipe extends on its way to the turbine, whereby said exhaust pipe is surrounded by the turbine exhaust manifold and the hot gases therein, the cylinders being in a V-arrangement, the turbine exhaust manifold including a cover for the V-shaped space formed by the cylinders, said space being connected to the turbine exhaust outlet and receiving said exhaust pipe leading from the cylinders to the turbine.

References Cited in the file of this patent

UNITED STATES PATENTS

| | | |
|---|---|---|
| 1,674,832 | Lugt | June 26, 1928 |
| 1,921,906 | Büchi | Aug. 8, 1933 |
| 2,113,077 | Büchi | Apr. 5, 1938 |
| 2,305,295 | Lang et al. | Dec. 15, 1942 |
| 2,402,725 | Birkigt | June 25, 1946 |
| 2,624,171 | Kollsman | Jan. 6, 1953 |
| 2,674,086 | Nichols | Apr. 6, 1954 |

FOREIGN PATENTS

| | | |
|---|---|---|
| 613,187 | Great Britain | Nov. 23, 1948 |